US011140642B2

United States Patent
Gattu (10) Patent No.: US 11,140,642 B2
(45) Date of Patent: Oct. 5, 2021

(54) SYNCHRONIZED WIRELESS NETWORKS SYSTEM INCLUDING TIME-BASED IDENTITY OF DEVICES

(71) Applicant: Carrier Corporation, Palm Beach Gardens, FL (US)

(72) Inventor: Ramakrishna Gattu, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 22 days.

(21) Appl. No.: 16/610,183

(22) PCT Filed: May 3, 2018

(86) PCT No.: PCT/US2018/030800
§ 371 (c)(1),
(2) Date: Nov. 1, 2019

(87) PCT Pub. No.: WO2018/204584
PCT Pub. Date: Nov. 8, 2018

(65) Prior Publication Data
US 2021/0092695 A1    Mar. 25, 2021

Related U.S. Application Data

(60) Provisional application No. 62/501,486, filed on May 4, 2017.

(51) Int. Cl.
*H04B 7/14* (2006.01)
*H04W 56/00* (2009.01)
(52) U.S. Cl.
CPC ............ *H04W 56/001* (2013.01); *H04B 7/14* (2013.01)

(58) Field of Classification Search
CPC .............................. H04W 56/001; H04B 7/14
See application file for complete search history.

(56) References Cited

U.S. PATENT DOCUMENTS

| 4,445,213 A | 4/1984 | Baugh |
| 5,719,859 A | 2/1998 | Kobayashi |
| 5,719,868 A | 2/1998 | Young |

(Continued)

FOREIGN PATENT DOCUMENTS

WO    2014077673 A1    5/2014

OTHER PUBLICATIONS

International Search Report and Written Opinion for PCT/US2018/030800; Application Filing Date May 3, 2018; dated Jul. 19, 2018 (16 pages).

(Continued)

*Primary Examiner* — Lakeram Jangbahadur
(74) *Attorney, Agent, or Firm* — Cantor Colburn LLP (57) ABSTRACT

A wireless network data communication system includes a plurality of slave nodes and a central processing unit. Each slave node is assigned thereto a transmission time interval and is configured to transmit data based on its assigned transmission time interval. The central processing unit is in signal communication with the slave nodes to receive transmitted data. The central processing unit is further configured to identify a given slave node from among the plurality of slave nodes based on a comparison between an arrival time at which transmitted data was received and the transmission time intervals assigned to each slave node.

12 Claims, 7 Drawing Sheets

(56) References Cited

U.S. PATENT DOCUMENTS

| | | | |
|---|---|---|---|
| 5,883,901 A | 3/1999 | Chiu | |
| 6,751,248 B1 | 6/2004 | Tan | |
| 6,807,160 B1 | 10/2004 | Laroia | |
| 7,502,360 B2 | 3/2009 | Liu | |
| 7,522,924 B2 | 4/2009 | Abeta | |
| 8,767,705 B2 | 7/2014 | Goppner | |
| 8,995,380 B2 | 3/2015 | Choi | |
| 9,036,612 B2 | 5/2015 | Gidlund | |
| 9,455,764 B2 | 9/2016 | Mushkin | |
| 2007/0253021 A1* | 11/2007 | Mehta | H04L 63/061 358/1.15 |
| 2010/0202303 A1* | 8/2010 | Gu | G01S 11/02 370/252 |
| 2012/0147808 A1 | 6/2012 | Rhee | |
| 2014/0293828 A1* | 10/2014 | Lee | H04J 3/0652 370/254 |
| 2014/0355502 A1* | 12/2014 | Xhafa | H04W 52/0219 370/311 |
| 2015/0173034 A1* | 6/2015 | Rode | H04B 7/024 370/330 |

OTHER PUBLICATIONS

LAN/MAN Standards Committee, Part 15.4: Low-Rate Wireless Personal Areal Networks (LR-WPANs), Amendment 1: MAC sublayer; IEEE Standards Association, Apr. 16, 2012, 225 pages.

* cited by examiner

SYNCHRONIZED WIRELESS NETWORKS SYSTEM INCLUDING TIME-BASED IDENTITY OF DEVICES

CROSS-REFERENCE

This application is a National Stage of International Application No. PCT/US2018/030800, filed May 3, 2018, which claims the benefit of U.S. Provisional Application No. 62/501,486, filed May 4, 2017, the disclosures of which are incorporated by reference herein in their entirety.

BACKGROUND

Exemplary embodiments pertain to the art of wireless communication networks, and more particularly, to a wireless network configured to synchronize data communication among several wireless devices.

Wireless communication networks can facilitate wireless data communication between a central processing unit or access point, and one or more clients sometimes referred to as slave nodes. It is not uncommon for several independent slave nodes to be installed in the wireless network. Therefore, the slave nodes must be identified by the central processing unit and synchronized to allow for communication without causing interference with each other or data collisions at the central processing unit. Conventional central processing units typically rely on unique codes identification (ID) values for identifying the various devices operating in the wireless system. However, the slave nodes are still required to actively request a dynamically changing time slot from the central processing, and the time at which a slave node requests the time slot is typically unpredictable. Therefore, the central processing unit must actively seek time slot requests which continuously consumes power and places an extensive load on the overall wireless network. Similarly, slave nodes are typically required to remain active which reduces energy efficiency.

BRIEF DESCRIPTION

According to a non-limiting embodiment, a wireless network data communication system comprises a plurality of electronic slave nodes and an electronic central processing unit. Each slave node has assigned thereto a transmission time interval and is configured to transmit data based on its assigned transmission time interval. The electronic central processing unit is in signal communication with the slave nodes. The central processing unit is configured to receive transmitted data from the slave nodes, and to identify a given slave node from among the plurality of slave nodes based on a comparison between an arrival time at which transmitted data was received and the transmission time intervals assigned to each slave node.

In accordance with additional or alternative embodiments, the central processing unit identifies the given slave node without requiring additional identification information transmitted by the given slave node.

In accordance with additional or alternative embodiments, the given node is identified in response to the arrival time matching the transmission time interval assigned to the given node.

In accordance with additional or alternative embodiments, the transmission time intervals assigned to each slave node are different from one another.

In accordance with additional or alternative embodiments, the plurality of slave nodes include a repeater node and an extended node. The repeater node is located at a direct communication distance from the central processing unit that allows the repeater node to electrically communicate directly with the central processing unit. The extended node is in signal communication with the repeater node, while located beyond the direct communication distance.

In accordance with additional or alternative embodiments, the repeater node relays transmitted data from the extended node to the central processing unit.

In accordance with additional or alternative embodiments, the extended node is assigned an extended node transmission time interval different from the transmission time intervals of the repeater node and remaining slave nodes.

In accordance with additional or alternative embodiments, the repeater node relays the transmitted data from the extended node during the extended node transmission time interval.

In accordance with additional or alternative embodiments, the central processing unit identifies the extended node based on a comparison between the arrival time of the transmitted data and the extended node transmission time interval.

In accordance with additional or alternative embodiments, prior to receiving transmitted data from the extended node, the repeater node performs a synchronization process that synchronizes the extended node with respect to the repeater node and remaining slave nodes.

In accordance with additional or alternative embodiments, in response to receiving an installation request from the extended node, the repeater node assigns the extended node transmission time interval, and outputs a time interval schedule to the central processing unit. The time interval schedule indicates the extended node transmission time interval assigned to the extended node.

According to another non-limiting embodiment, a method is provided to synchronize a plurality of electronic slave nodes installed in a wireless communication network system. The method comprises establishing direct signal communication between an electronic central processing unit and at least one slave node that is located at a direct communication distance from the central processing unit. The method further comprises assigning each slave node among the plurality of slave nodes a transmission time interval indicative of a time at which the slave node transmits data. The method further comprises transmitting data from a given slave node among the plurality of slave nodes at its assigned data transmission interval. The method further comprises identifying, via the central processing unit, the given slave node based on a comparison between an arrival time at which transmitted data was received by the central processing unit and the transmission time intervals assigned to each slave node.

In accordance with additional or alternative embodiments, the method includes identifying, by the central processing unit, the given slave node without requiring additional identification information transmitted by the given slave node.

In accordance with additional or alternative embodiments, the method includes identifying, by the central processing unit, the given slave node in response to the arrival time matching the transmission time interval assigned to the given node.

In accordance with additional or alternative embodiments, the method includes assigning different transmission time intervals to each slave node.

In accordance with additional or alternative embodiments, the method includes locating an extended node beyond the direct communication distance while establishing signal communication with the at least one slave located at the direct communication distance.

In accordance with additional or alternative embodiments, the method includes relaying transmitted data from the extended node to the central processing unit using the at least one slave located at the direct communication distance.

In accordance with additional or alternative embodiments, the method includes assigning, to the extended node, an extended node transmission time interval that is different from the transmission time intervals of the each slave node among the plurality of slave nodes.

In accordance with additional or alternative embodiments, the method includes relaying the transmitted data output from the extended node to the central processing unit during the extended node transmission time interval.

In accordance with additional or alternative embodiments, the central processing unit identifies the extended node based on a comparison between the arrival time of the transmitted data and the extended node transmission time interval.

In accordance with additional or alternative embodiments, prior to receiving transmitted data from the extended node, the repeater node performs a synchronization process that synchronizes the extended node with respect to the repeater node and remaining slave nodes.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Various non-limiting embodiments described herein provide a wireless communication network that includes a central processing unit or central access point which assigns a unique periodic reporting time slot or transmission time interval to each slave node installed in the network. No time slot is the same such that the central processing unit ensures that data transmission from one slave node will not interfere or will not collide with data transmissions from any of the remaining slave nodes. In at least one embodiment, each slave node is assigned at unique transmission time interval that does not overlap with the other assigned transmission time intervals. In this manner, the central processing unit is given sufficient time to process the data received from each slave node while avoiding data collisions. In addition, because the central process node assigns each slave node with a unique time slot, the central processing unit can identify a particular slave node based on an arrival time of a given data packet. In this manner, the slave nodes are not required to transmit additional identification (ID) information or unique ID codes with their data packet thereby reducing the operating load of the central processing unit and increasing overall network processing speeds.

Figure 1:
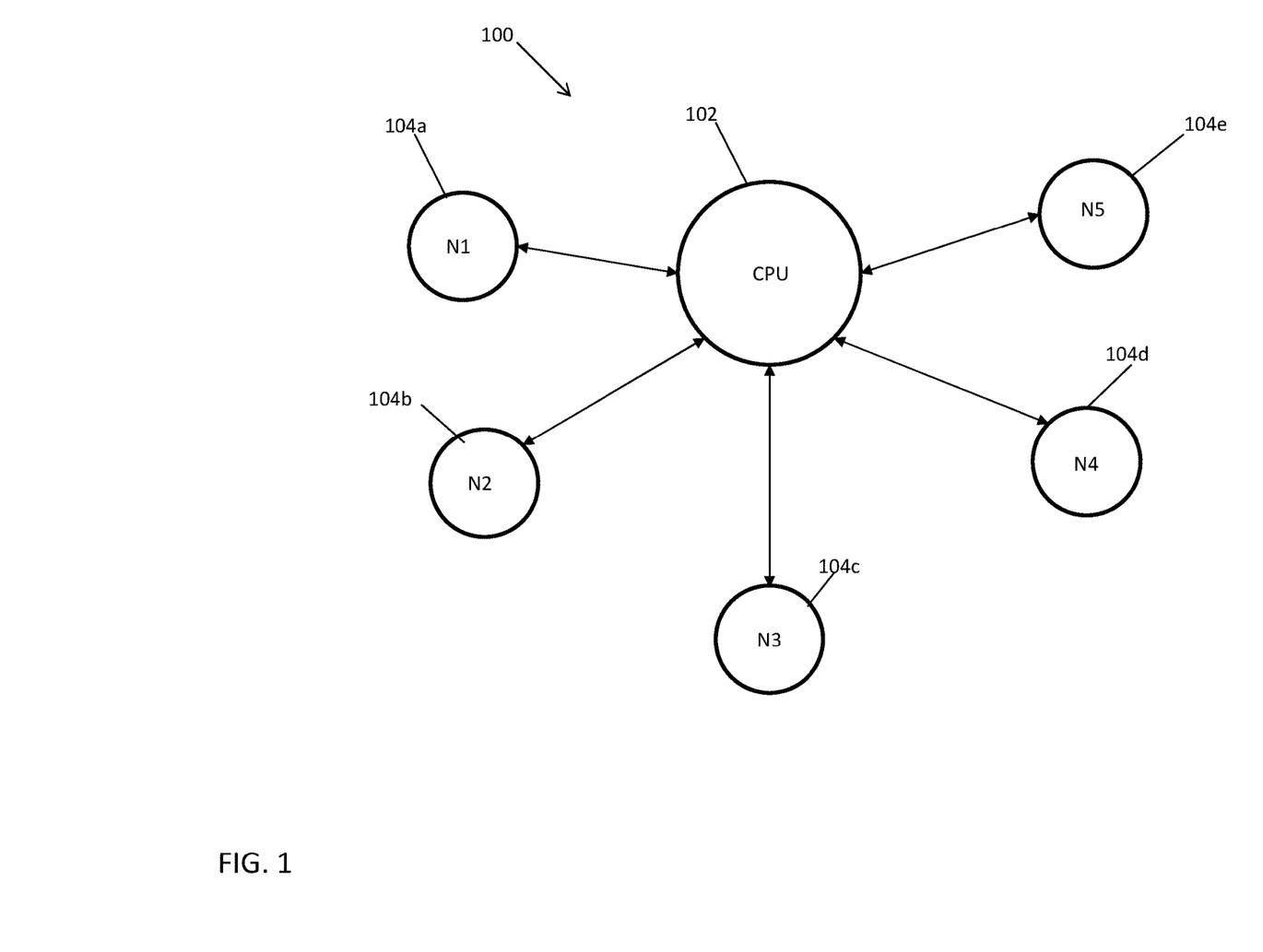
FIG. 1 illustrates a wireless network including a central processing unit and a plurality of wireless slave nodes according to a non-limiting embodiment.

Turning now to FIG. 1, a wireless network 100 including a central processing unit 102 and a plurality of wireless slave nodes 104a, 104b, 104c, 104d, and 104e is illustrated according to a non-limiting embodiment. Although five slave nodes 104a-104e are illustrated, the invention is not limited thereto. For example, the wireless network 100 can include more or less slave nodes without departing from the scope of the invention. Similarly, although the wireless network 100 described herein is illustrated with the one central processing unit 102, it is possible to use any appropriate number of other central processing units to provide the functionality described herein. For example, it may be possible to provide redundant central processing units that take over primary operation upon failure of a primary processing node.

The central processing unit 102 exchanges digital data with the slave nodes 104a-104e. The digital data includes, but is not limited to, sensor data, status information, commands, etc. The central processing unit 102 can be implemented using any appropriate hardware, such as an off-the-shelf hardware processor and/or transceiver hardware capable of providing the functionality described herein. In at least one non-limiting embodiment, the central processing unit 102 can include an electronic hardware controller, a transceiver, memory, and a power source.

The controller (not shown) can be any type of electronic hardware control unit or processor capable of providing the functionality described herein. In an embodiment, the controller can include a timer that functions as further described elsewhere herein, for example, having a similar accuracy as a timer included with the slave nodes 104a-104e as discussed in greater detail below.

The transceiver (not shown) can be in signal communication with the controller, and facilitate wireless communication between the central processing unit 102 and one or more of the slave nodes 104a-104e. The transceiver can communicate with one or more of the slave nodes 104a-104e using any appropriate protocol, including protocols that provide for high speed packet based digital data exchange, or a short-range wireless communication protocol such as Bluetooth®. It should be appreciated that the wireless network 100 described herein does not depend upon the use of any particular communication protocol or class of protocols and does not depend on the use of any particular frequency or frequencies.

The memory (not shown) may be in signal communication with the controller and can be used to store data generated by the controller in connection with operation thereof. In at least one non-limiting embodiment, the memory may be volatile memory (e.g., semiconductor RAM) while the controller uses non-volatile memory (not shown) for software thereof that includes processor instructions, constant data values used for execution, etc. It should be appreciated, however, that any appropriate type of memory may be used.

The power source (not shown) can be electrically coupled to the controller, the transceiver, and the memory. The power source can be a battery (rechargeable or not), a fixed power supply, or any other component capable of generating electrical power for operation of electronic portions of central processing unit 102. The central processing unit 102 can also be coupled to an external power source.

The slave nodes 104a-104e can include various sensor components (e.g., microphones, accelerometers, cameras, etc.), a transceiver, and a power source. The slave nodes 104a-104e can represent any appropriate wireless data transceiver and thus, referenced herein to the slave nodes 104a-104e and/or a subset of the slave nodes 104a-104e (described later to include repeater nodes and extended nodes), should be understood to include a general reference to a wireless data transceiver.

The transceiver (not shown) facilitates wireless communication between a given slave node (e.g., 104a), the central processing unit 102, and/or other remaining slave nodes (e.g., 104b-104e). The transceiver can facilitate data communication using any appropriate protocol, including protocols that provide for high speed packet based digital data exchange, or short-range communication protocols such as, for example, Bluetooth®. In any case, it should be appreciated that the wireless network 100 described herein does not depend upon the use of any particular communication protocol or class of protocols and does not depend on the use of any particular frequency or frequencies.

The power source (not shown) is electrically coupled to the sensor components (not shown), the transceiver, and any other local component that requires power. The power source may be a battery (rechargeable or not), or any other component capable of generating electrical power for operation of electronic portions of a given slave node 104a-104e. The slave nodes 104a-104e may also conserve power (i.e., power from the power source) by invoking a "sleep mode" to minimize power consumption.

In at least one embodiment, one or more of the slave nodes 104a-104e can be constructed as digital sensors. In this manner, the slave nodes 104a-104e can provide appropriate sensing functionality according to the particular application. For example, the slave nodes 104a-104e can include temperature sensing components, smoke detecting components, vibration sensing components, etc.

In at least one embodiment, one or more slave nodes 104a-104e can be constructed as a smart sensor or other electronic device capable of performing logical functions and other autonomous operations. When constructed as a smart sensor, a given slave node 104a-104e can include a dedicated processor and memory. The processor (not shown) may be coupled to, and receive data from, the transceiver. The processor can be any type of processor capable of providing the functionality described herein. In at least one embodiment, the processor is capable of operating in an active mode or placed into an idle (sleep) mode that consumes less power or possibly even no power at all. The processor may include a timer that functions as further described elsewhere herein, for example, a high precision (sub-millisecond) timer that may be restarted when the sensor node wakes up from a sleep node. The processor can be understood as including a single processor chip, or a more involved circuit/board. Accordingly, the components illustrated herein denote functional blocks that perform certain functions, rather than necessarily representing particular discrete components. In that regard, the system described herein may be implemented using a single chip that combines transceiver and processor functions, and possibly also includes some memory.

The memory (not shown) can be coupled to the transceiver and the processor. Accordingly, the memory can store data received by the transceiver, temporary data generated by the processor in connection with operation thereof, or other data delivered to the slave node 104a-104e. The memory can be volatile memory (e.g., semiconductor RAM) while the processor uses non-volatile memory (not shown) for software thereof that includes processor instructions, constant data values used for execution, etc. It should be appreciated, however, that the slave nodes 104a-104e can implement any appropriate type of memory.

The central processing unit 102 and the slave nodes 104a-104e communicate using an appropriate wireless frequency and/or protocol in accordance with the system described herein. In various embodiments, the central processing unit 102 and the slave nodes 104a-104e can use off-the-shelf wireless communication devices to communicate wirelessly. The wireless network 100 described herein facilitates wireless digital data communication with variable sized or fixed sized data packets. In at least one non-limiting embodiment, the wireless network 100 operates according to a short-range wireless communication standard such as, for example, Bluetooth®. The wireless network 100 can also operate according to multiple communication protocols, thereby facilitating data communication between multiple devices (e.g., slave nodes 104a-104e) configured to operate according to different protocols and frequency spectrums.

Figure 2:
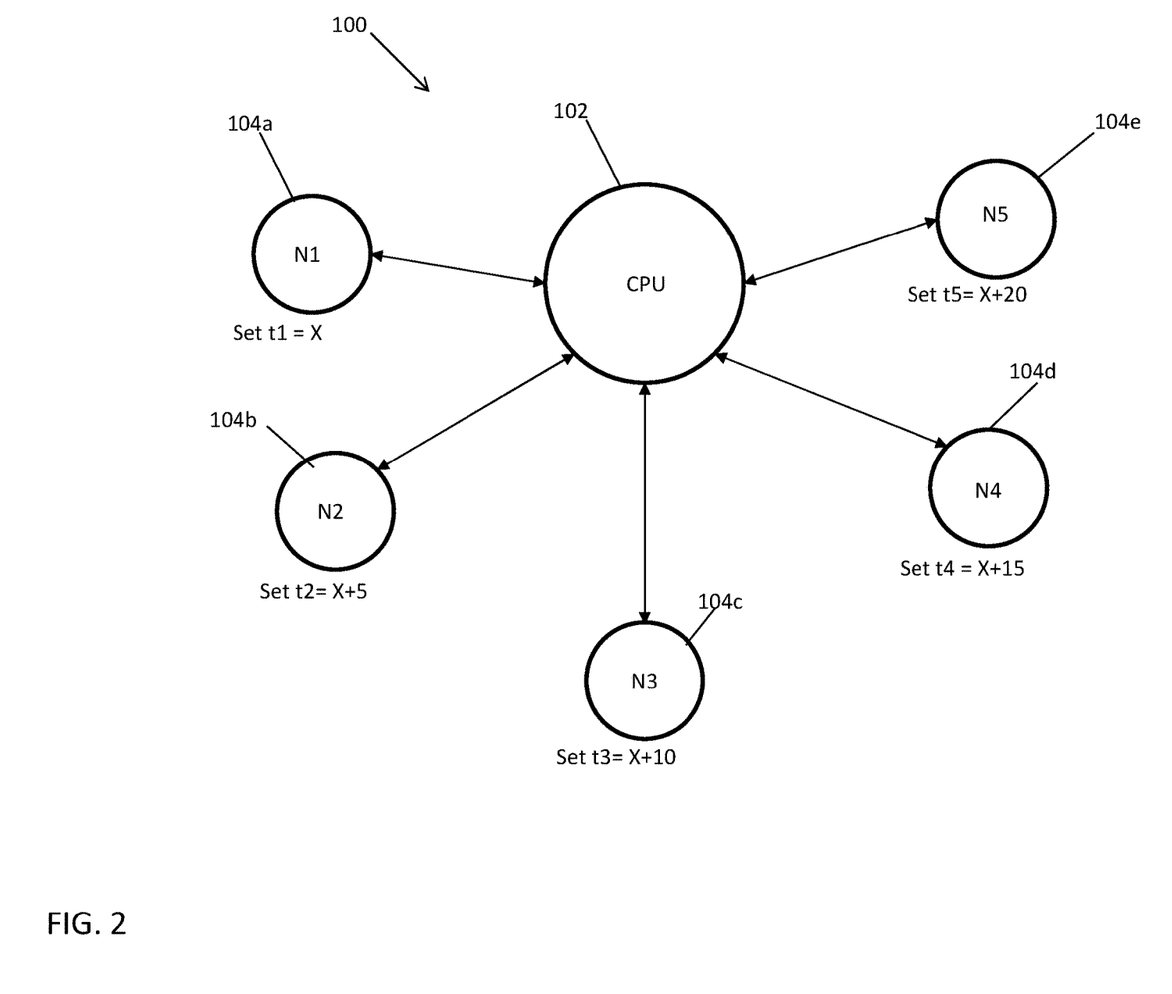
FIG. 2 illustrates the wireless network of FIG. 1 following an initial synchronization operation that synchronizes the data transmission (Tx) times of the slave nodes.

Turning to FIG. 2, the central processing unit 102 can perform an initial data transmission (Tx) synchronization operation. The initial Tx synchronization operation synchronizes Tx times between the slave nodes 104a-104e by allocating unique periodic time slots or transmission time interval variables (t1, t2, t3, tn) to each slave node 104a-104e. The transmission time interval variables (t1, t2, t3, tn) control a time at which a given slave node 104a-104e is authorized to transmit data. According to a non-limiting embodiment, the central processing unit 102 outputs a timer set command to first node, e.g., N1 104a to set a "timerStart" variable (t1). The t1 variable indicates the time interval at which N1 104a is authorized to initiate data communication. In response to setting its t1, N1 104a initiates its periodic communication timer according to "X" time units. If X were set to 60 seconds, for example, N1 104a would initiate communication at 60 second intervals. Thus, N1 104a would initiate data transmission time at instances of X, X+60, X+120, X+180, etc.

After setting the timerStart variable (i.e. t1) for N1 104a, the central processing unit records the value of t1 (e.g., X=60 seconds) in a timing schedule stored in memory. Further, because the central processing unit 102 stores the assigned t1 in memory, the central processing unit 102 is aware of the time intervals (e.g., X, X+60, X+120, X+180, etc.) at which N1 104a may initiate data transmission, the central processing unit 102 can determine that particular data received at X, X+60, X+120, X+180, etc., was transmitted by N1 104a. Therefore, N1 104a is not required to transmit additional ID data or ID codes to identify itself. Although the timerStart units of t1 are described as being in seconds, it should be appreciated that any unit of time (e.g., milliseconds) may be implemented. In response to setting t1, N1 104a can transmit an acknowledgement signal (ACK) to the central processing unit 102, which confirms completion of the confirming completion of its timerStart time unit (e.g., t1).

A second slave node, e.g., N2 104*b*, can be synchronized in a similar manner, but with a different timerStart variable (i.e., t2). In this manner, N1 104*a* and N2 104*b* initiate data transmissions at different times, thereby avoiding data collisions at the central processing unit 102. In at least one non-limiting embodiment, the central processing unit 102 can set a second timerStart variable (t2) for N2 104*b* that is different from t1. Accordingly, the central processing unit 102 can select time interval that ensures there is a sufficient time period between the transmission time of N1 104*a* and the transmission time of N2 104*b* to avoid data collision. For example, to generate a 5 second time period between the transmission time of N1 104*a* and the transmission time of N2 104*b*, the central processing unit can set 't2' at (X+5) seconds. Accordingly, N2 104*b* is set to transmit data packets at time intervals of X+5, (X+5)+60, (X+5)+120, (X+5)+180, etc.

Unique timerStart variables can be set for the remaining slave nodes 104*c*-104*e* in a similar manner as described above. For example, t3 for N3 104*c* can be set at X+10. Accordingly, N3 104*c* transmits data at time intervals of X+10, (X+10)+60, (X+10)+120, (X+10)+180, etc. The variable t4 for N4 104*d* can be set at X+15. Accordingly, N4 104*d* transmits data at time intervals of X+15, (X+15)+60, (X+15)+120, (X+15)+180, etc. Similarly, t5 for N5 104*e* can be set at X+20. Accordingly, N5 104*e* transmits data at time intervals of X+20, (X+20)+60, (X+20)+120, (X+20)+180, etc. By assigning unique timerStart variables (t1-t5) for each slave node 104*a*-104*e*, the central processing unit 102 can ensure that the data transmission of the slave nodes 104*a*-104*e* do not overlap with one another, while also providing enough time to receive and process information from every slave node 104*a*-104*n* installed in the wireless network 100. In addition, the central processing unit 102 is aware of each unique time intervals at which every slave node 104*a*-104*e* is authorized to initiate data transmission. Accordingly, the central processing unit 102 can identify which particular slave node transmitted a given data packet based on the arrival time of the data packet, without requiring the slave node to send additional ID information for identifying itself. As a result, the additional processing time necessary for conventional central units to identify a particular node is eliminated.

In addition, the central processing unit 102 can schedule its low-power mode or sleep mode based on the timing schedule stored in memory. Because the timing schedule indicate the transmission time interval variables (e.g. t1-tn) of all slave nodes operating in the wireless network 100, the central processing unit 102 can awake from a sleep mode during the transmission time interval of a particular slave node, and once data transmission is completed, can reinitiate the sleep mode until the following transmission time interval of another slave mode occurs.

In at least one non-limiting embodiment, the central processing unit 102 can resolve time drifts or timing interval deviations that may occur in the wireless network 100. For example, the central processing unit 102 can perform an auto-drift resolution operation and/or a periodic synchronization operation.

The auto-drift resolution operation includes establishing a tolerance window (i.e., +/−a time value) for a given time transmission interval of one or more slave nodes 104*a*-104*e*. For example, in a scenario a given slave node 104*n* operates according to X+15, (X+15+60) . . . transmission times, a tolerance window (tol) can be defined where a packet can be received within (X+15)+/−tol . . . (X+15+60)+/−tol . . . etc. Thus, for every data packet the central processing unit 102 receives within the tolerance window, the central processing unit 102 sets a midpoint of time slot to the instance of time at which the data packet is received.

The periodic synchronization operation includes establishing a set time at which to resynchronize one or more of the slave nodes 104*a*-104*e*, repeater nodes (not shown in FIG. 2) and/or extended nodes (not shown in FIG. 2). The resynchronization event can be set for any time interval (e.g., every hour, every day, etc.) and/or can be invoked following a time period at which the central processing unit 102 is placed in a low power mode or non-active listening mode (i.e., sleep mode) for a set time period (i.e., the central processing unit 102 has been in sleep mode for 30 mins, 2 hours, etc.).

The time interval allocation process described herein can be utilized to establish a data communication standard where the unique time interval allocation mechanism described above is standardized across multiple protocols. In this manner, multiple devices (e.g. slave nodes 104*a*-104*e*) can exchange data within the wireless network 100, irrespective of the protocol they are using to communicate and without interrupting devices operating according to different network standards or different communication protocols. For example, a residential domain operating according to a 2.4 gigahertz (GHz) spectrum may include Wi-Fi-based devices, Bluetooth® low energy (BLE) technology-based devices, and/or IEEE 802.15.4-based specification-based devices such as, for example, devices operating according to Zigbee®-based devices. Accordingly, multiple different network devices can co-exist and avoid data contention by assigning all devices a dedicated time-slots or time interval at which they are authorized to transmit data.

Figure 3:
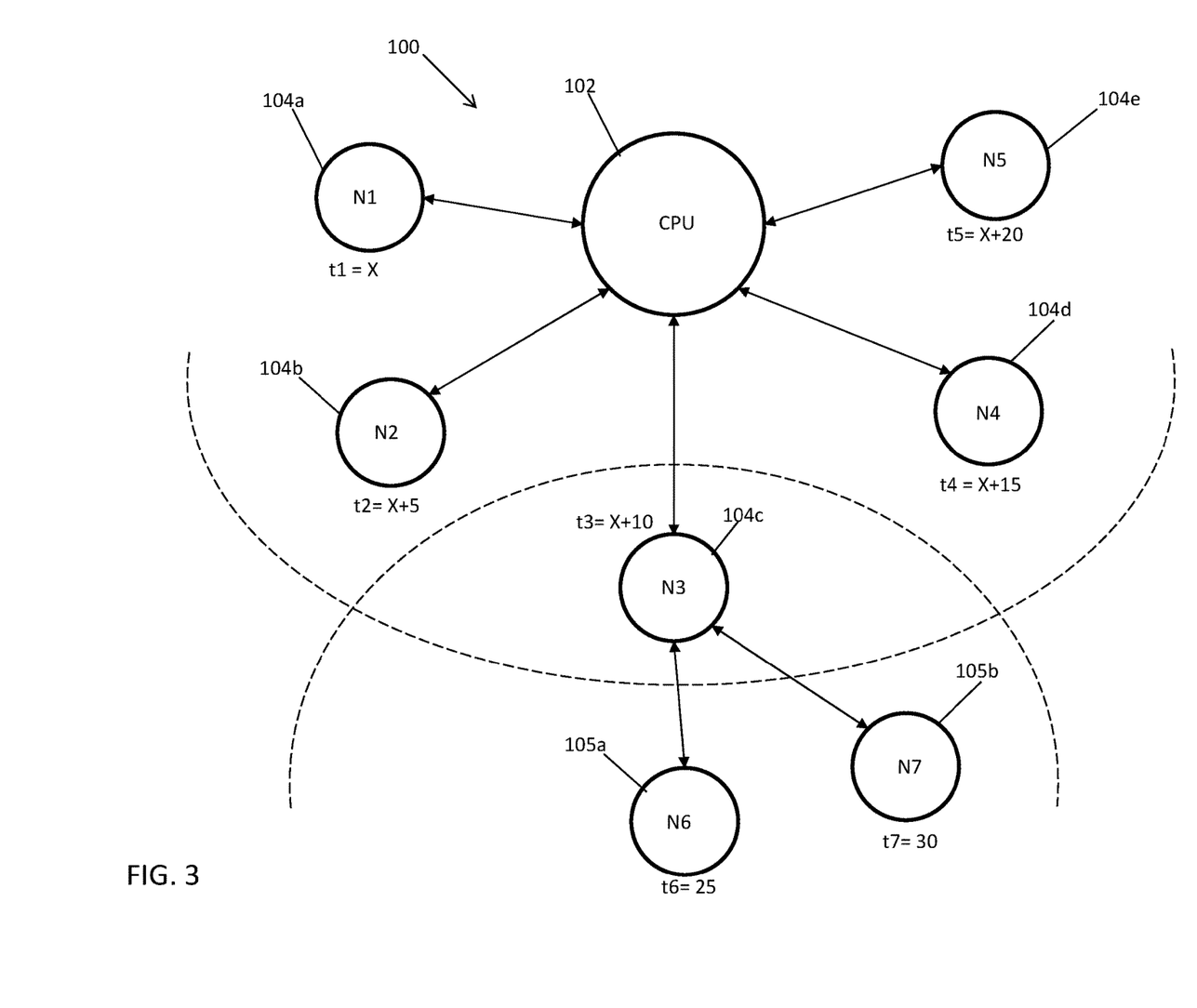
FIG. 3 is a diagram of a wireless network including a central processing node and a plurality of wireless slave nodes with at least one slave node serving as a repeater node in signal communication with at least one extended slave node according to a non-limiting embodiment.

Referring now to FIG. 3, the wireless network 100 is illustrated having one or more extended slave nodes N6 105*a* and N7 105*b*. An extended slave node is referred to as a node that is located at an extended distance which denies the extended node the ability to communicate directly with the central processing unit 102. In this case one or more slave nodes (e.g., 104*c*) in close proximity to both the central processing unit 102 and one or more of extended nodes (e.g., N6 105*a* and N7 105*b*) is referred to as a repeater node.

The repeater node N3 104*c* is capable of communicating with the central processing unit 102 according to its transmission time interval (e.g., t3) as described in detail above. The repeater node N3 104*c*, however, is also capable of communicating with one or more of the extended nodes N6 105*a* and N7 105*b*. In this manner, the repeater node N3 104*c* can relay data transmitted from the extended nodes N6 105*a* and/or N7 105*b*, to the central processing unit 102.

In at least one non-limiting embodiment, the central processing unit 102 initially identifies a repeater node (e.g., N3 104*c*) as a standard slave node and allocates it a unique data transmission variable (e.g., t3) as described above. Once t3 is assigned, the central processing unit 102 acknowledges N3 104*c* as a repeater node, and delivers a time interval schedule to N3 104*c*. The time interval schedule identifies all the nodes (e.g., slave nodes, repeater nodes and extended nodes) installed in the wireless network 100 along with their respective transmission time interval variable (e.g., t1-tn). Accordingly, the repeater node N3 104*c* is made aware of the assigned time intervals for all the nodes installed in the wireless network 100. Although a single repeater node N3 104*c* is described with reference to FIG. 3, it should be appreciated that multiple repeater nodes may be established. Accordingly, the central processing unit 102 would deliver the assigned timing interval schedule to all the established repeater nodes.

Once obtaining the assigned timing interval schedule, the repeater node N3 104e determines one or more available time intervals (i.e., time intervals that are excluded from the time interval schedule), and assigns extended nodes N6 105a and N7 105b with a unique time interval t6 and t7, respectively. For example, the repeater node N3 104e can set t6 as X+25, and t7 as X+30. Accordingly, extended node N6 105a transmits data at time intervals of X+25, (X+25)+60, (X+25)+120, (X+25)+180, etc., while extended node N7 105b transmits data at time intervals of X+30, (X+30)+60, (X+30)+120, (X+30)+180, etc.

The repeater node N3 104c, updates the time interval schedule with the newly assigned time intervals t6 and t7, and returns the updated time interval schedule to the central processing unit 102. The repeater node N3 104c can also update the schedule to indicate which extended nodes (e.g., N6 105a and N7 105b) it has relay control over. Accordingly, the central processing unit 102 is made aware of the authorized time slot at which the extended nodes N6 105a and N7 105b transmit data and can identify data transmitted by a given extended node N6 105a and N7 105b without requiring additional ID information as described above.

When an extended node (e.g., N6 105a) transfers data to the repeater node N3 104c, the repeater node N3 104c instantaneously relays the data from extended node to the central processing unit 102 within the authorized time interval of the extended node transmitting the data (e.g., t6). Because t6 is unique with respect to the timing intervals of the remaining slave nodes 104a-104e and extended node 105b, data collision is avoided. In addition, the central processing unit 102 correctly determines that the data received by the repeater N3 104c originated from the extended node N6 105a, for example, because that data was received during time interval t6 which is indicated in the schedule as corresponding to extended node N6 105a as opposed to t3 which corresponds to repeater node N3 104c.

Figure 4A:
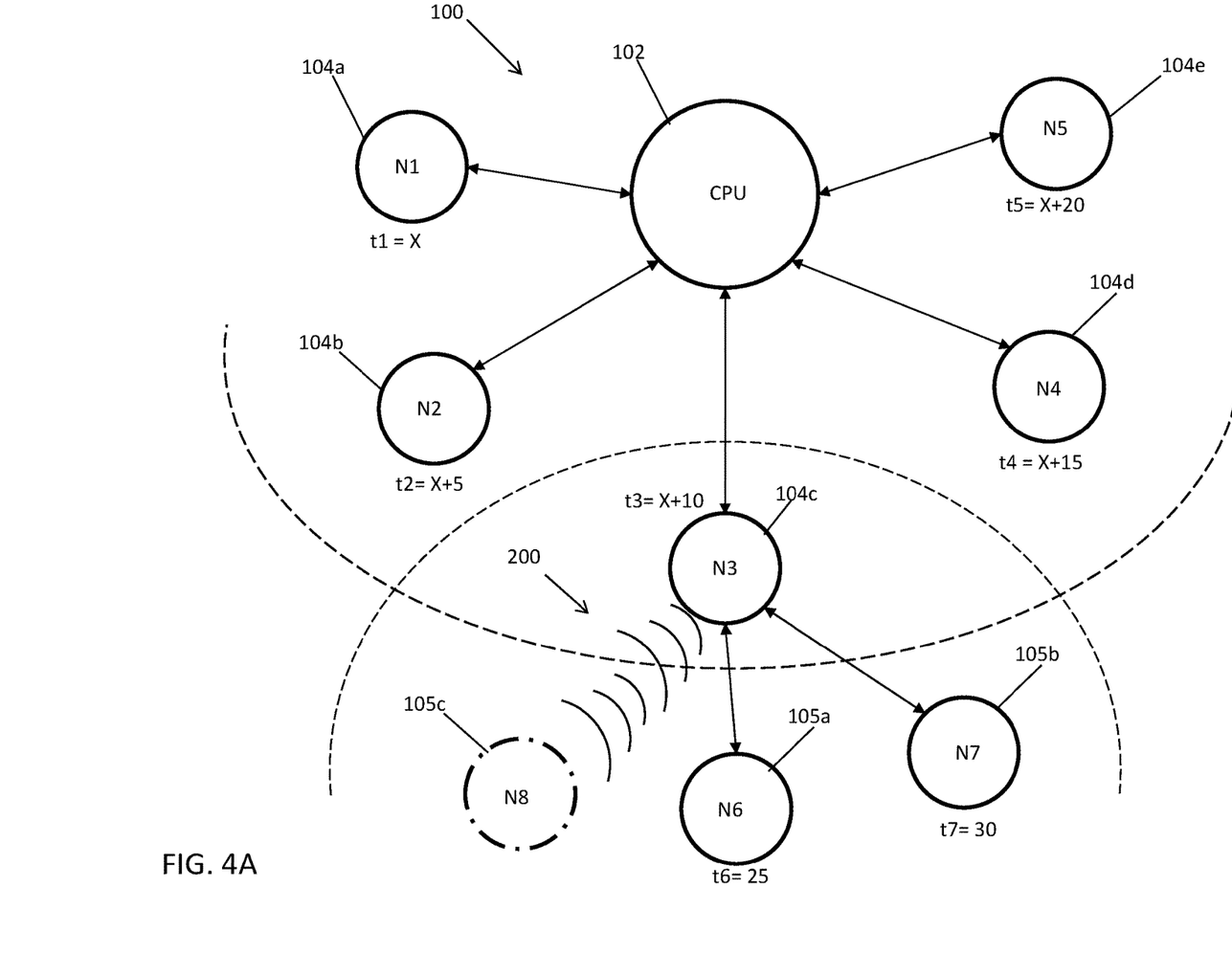
FIGS. 4A and 4B illustrate a wireless network configured to synchronize a newly added extended slave node with a repeater node according to a non-limiting embodiment.
Figure 4B:
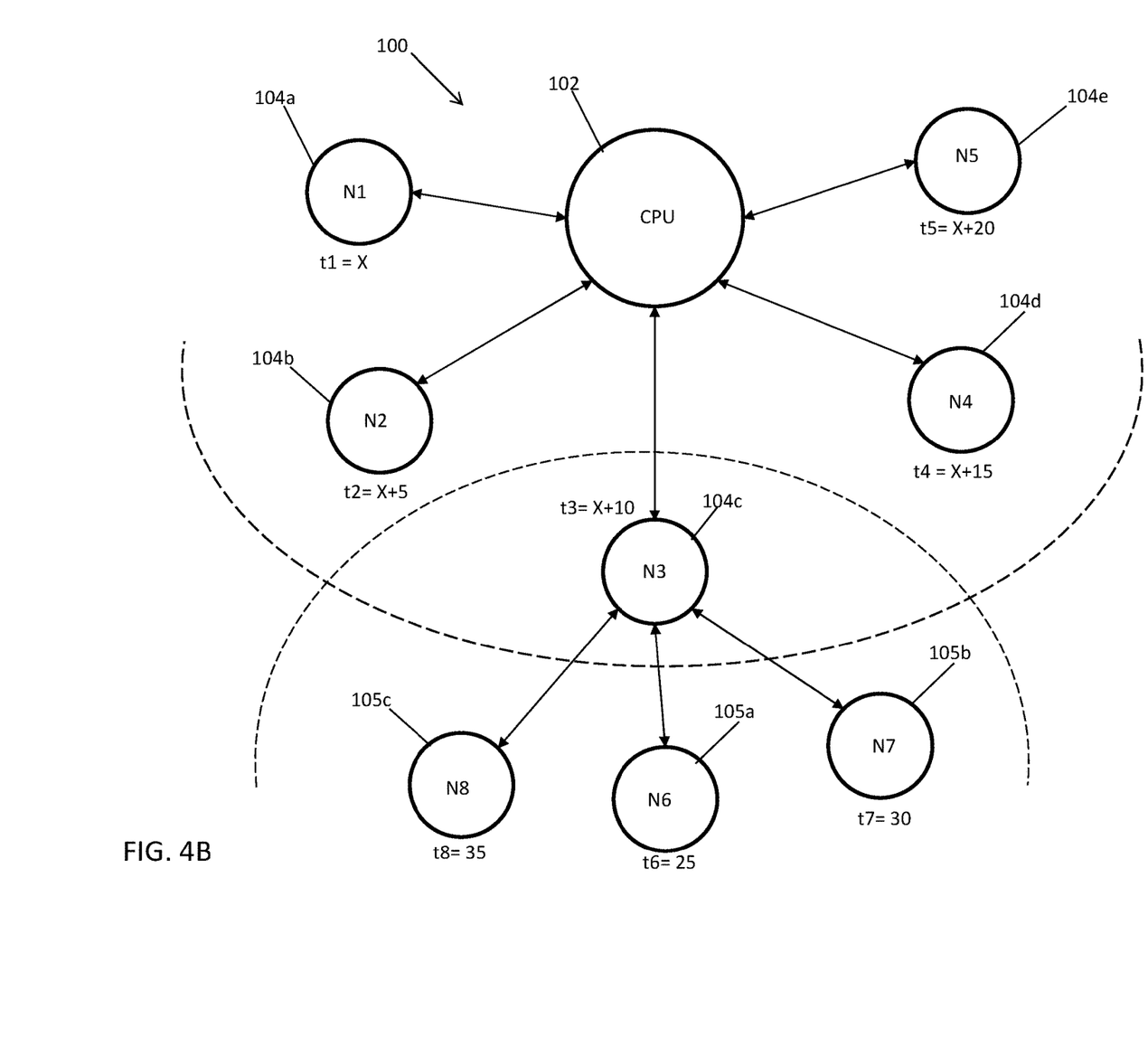

With reference to FIGS. 4A and 4B, the wireless network 100 is illustrated synchronizing a newly added extended slave node N8 105c. Although the same repeater N3 104c is illustrated as synchronizing the newly added extended node N8 105c, it should be appreciated that a different repeater node (not shown) can synchronize the newly extended node N8 105c when additional repeaters nodes are present in the wireless network 100.

In at least one embodiment, the newly added extended node N8 105c can automatically begin broadcasting an installation request 200 signal in response to being located or installed in the wireless network 100 (see FIG. 4A). In at least one embodiment, the newly added extended node N8 105c can continuously broadcast the installation request signal 200 to ensure the repeater node N3 104c receives the broadcast request once awaking from a sleep mode. At this stage, the newly added extended node N8 105c is not assigned a unique time interval and therefore is not synchronized (as indicated by the dashed outline) with the remaining slave nodes and/or the central processing unit 102.

Referring to FIG. 4B, the newly added extended node N8 105c is illustrated after being synchronized in the wireless network 100. In at least one embodiment, the repeater node N3 104c detects the broadcast request signal 200 from the newly added extended node N8 105c. In response to the broadcast request signal 200, the repeater node N3 104c initiates the synchronization process. In the case of synchronizing an extended slave node, the synchronization process allows for the repeater node N3 104c to assign the newly added extended node N8 105c its own unique time interval variable (e.g., t8). In this manner, the repeater node N3 104c is not required to continuously remain operating in a full power mode. Instead, the repeater node N3 104c can selectively invoke a low-power sleep mode because, unlike conventional system, the repeater node N3 104c is aware of the reception times assigned to extended nodes, and can awake from the sleep mode in time to receive a particular data transmission. In addition, the central processing unit 102 is free to perform various other operations, functions, data exchanges thereby improving the performance flexibility of the wireless network 100. The central processing unit 102 may also remain in a low-power sleep mode while the repeater node N3 104c performs synchronizes the newly added extended node N8 105c.

Once t8 is assigned, the repeater node N3 104c updates the time interval schedule to include the ID (e.g. N8) of the newly added extended node N8 105c, and delivers the updated timing interval schedule to the central processing unit 102. Accordingly, the central processing unit 102 is made aware of the newly installed extended node N8 105c, and the newly added extended node N8 105c is synchronized in the wireless network 100 (as indicated by the solid outline. In addition, the central processing unit 102 is able to identify its transmitted data according to its transmission interval t8 without requiring the newly added extended node N8 105c to transmit additional ID information as described above.

Figure 5A:
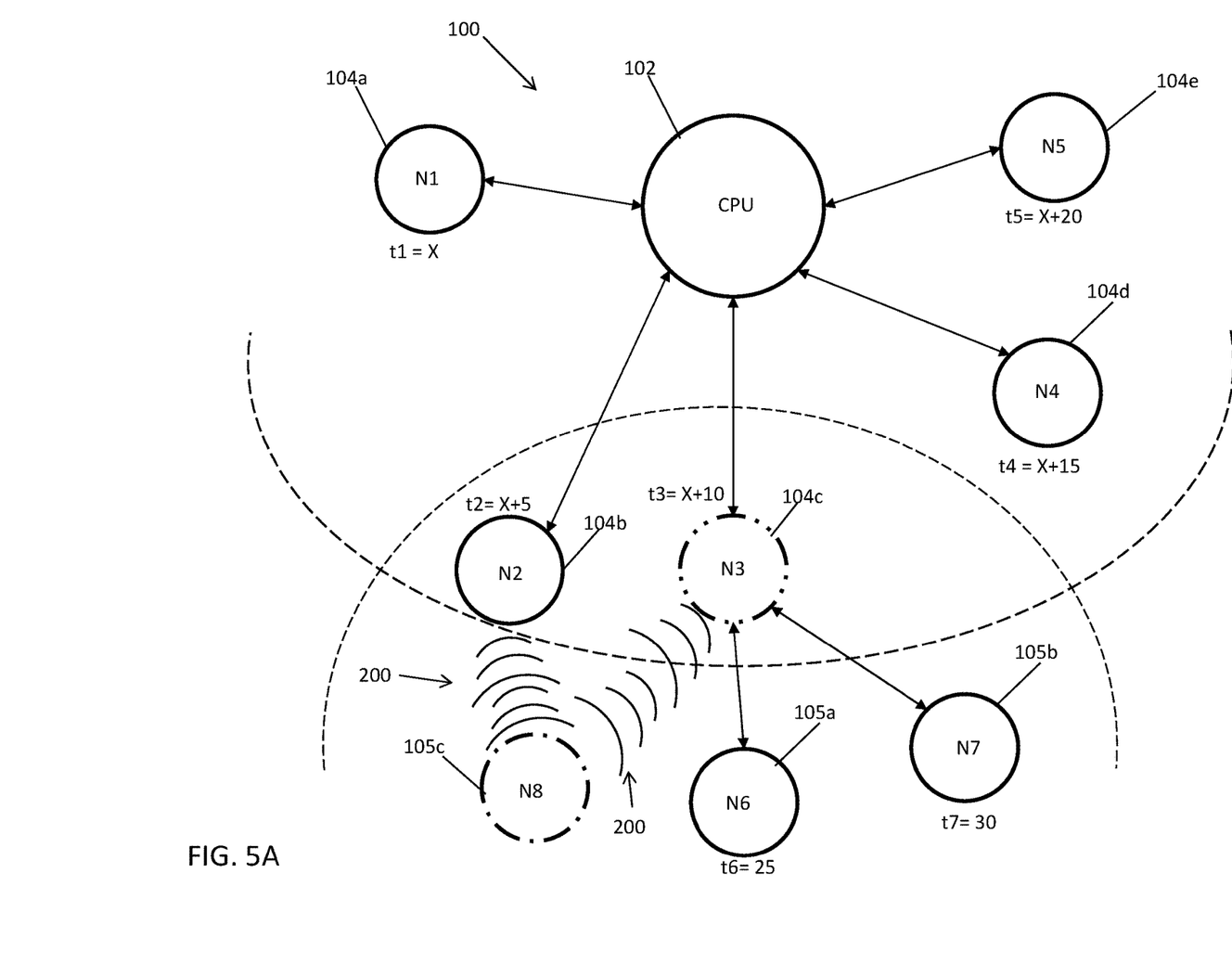
FIGS. 5A and 5B illustrate a wireless network configured to synchronize a newly added extended slave node with a repeater node according to another non-limiting embodiment.
Figure 5B:
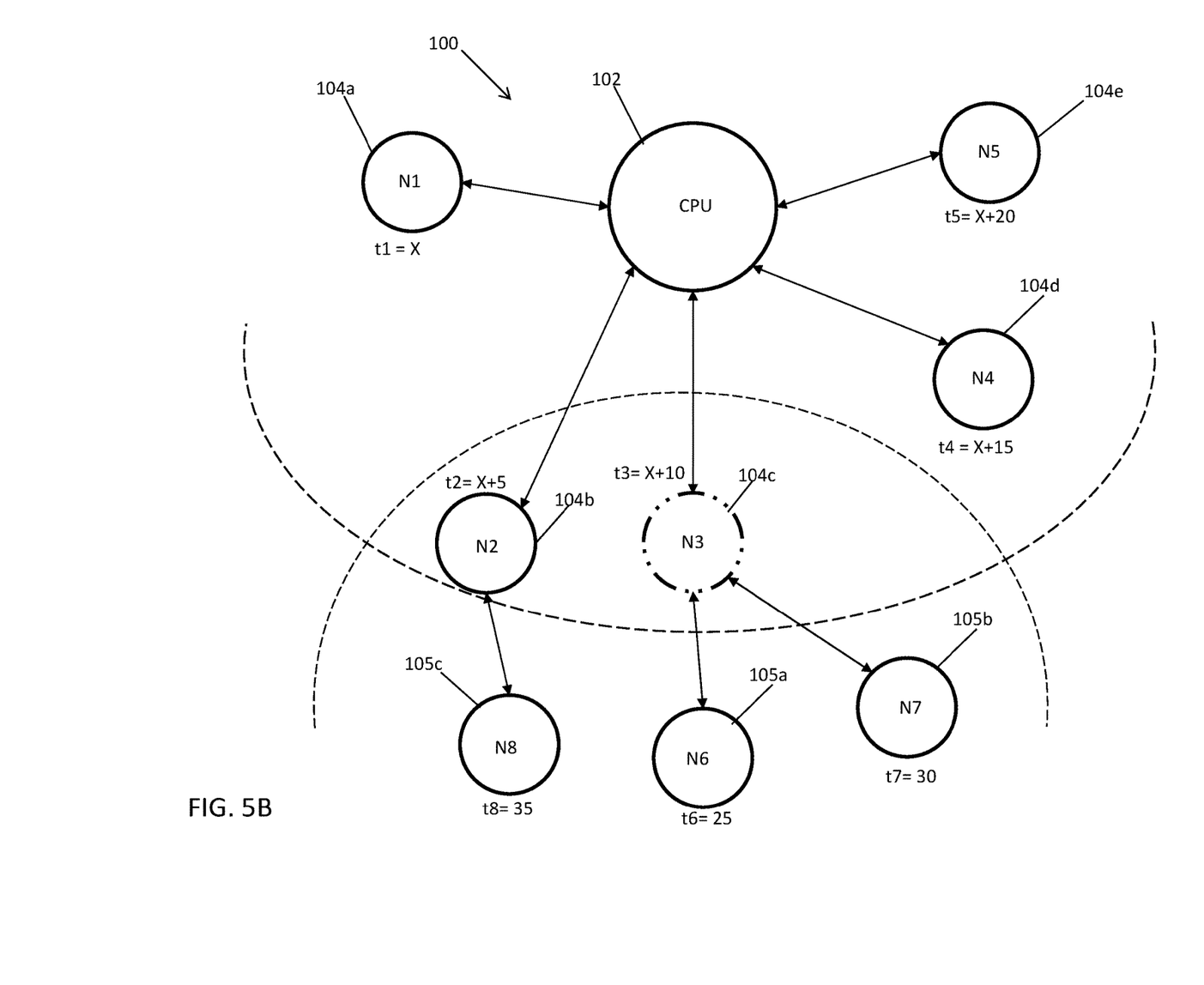

Turning to FIGS. 5A and 5B, the wireless network is illustrated with two repeater nodes N2 104b and N3 104c that are capable of synchronizing a newly added extended slave node N8 105c. The repeaters nodes N2 104b and N3 104c can operate in a sleep mode to conserve power as described above. To reduce synchronization wait time, however, the sleep time of the repeaters nodes N2 104b and N3 104c can be staggered.

Referring to FIG. 5A, for example, a newly added extended node N8 105c is installed or located in the wireless network 100 but is not yet synchronized (as indicated by its dashed outline). As further illustrated in FIG. 5A, a first repeater node N2 104b is awake (as indicated by its solid outline) and actively seeks broadcasted installation requests 200 while a second repeater node N3 104c is operating in a low-power or sleep mode (as indicated by its dashed outline) which may prevent it from detecting a broadcasted installation request 200. Accordingly, the first repeater N2 104c detects the installation broadcast request from the newly added extended node N8 105c.

Referring to FIG. 5B, the first repeater node N2 104b performs a synchronization operation and assigns the newly added extended node N8 105c with a unique transmission interval variable (e.g., t8=X+35). Accordingly, the newly added extended node N8 105c is capable of transmitting data in the wireless network 100 without interrupting data transmission of the remaining nodes (i.e., slave nodes, repeater nodes, and extended nodes).

In at least one embodiment, the first repeater node N2 104b updates its own timing interval schedule to indicate that it now has relay control over the newly added extended node N8 105c. The updated timing interval schedule of the first repeater node N2 104b is then transmitted to the central processing unit 102. Accordingly, the central processing unit 102 is made aware of the particular extended nodes over which the repeaters are controlling. For example, the central processing unit 102 may receive a first timing interval timing schedule from the first repeater N2 104b indicating that it has relay control over extended node N8 105c, while receiving a second interval timing schedule from the second repeater N3 104c indicating that it has relay control over extended nodes N6 105a and N7 105b.

The wireless network 100 described herein can be utilized to establish various types of wireless communication systems. For example, multiple slave nodes (including repeater nodes and extended nodes) installed in the wireless network 100 can include thermal sensing circuitry. The slave nodes are in signal communication with a central processing unit 102 configured to control temperature and thermal output components such as heating, ventilation and air conditioning (HVAC) system, thereby establishing a temperature control system. In at least one embodiment, the wireless network system utilizes BLE communication protocol, which allows slave nodes to operate in a transmission mode, (i.e., operate as broadcasting device, or in a connection and data transfer mode (i.e., operate as a peripheral device). For example, the slave nodes can operate in two modes. A first mode is referred to as a BLE Broadcaster mode which broadcasts packets to a device operation gin an observer mode. A second mode is referred to as a BLE peripheral mode which allows a slave node to connect and communicates to the central processing node 102

The central processing unit 102 includes a BLE master controller which receives data from one or more slave nodes. When the one or more slave devices operate as broadcast device to broadcast data at their assigned time intervals or slot and when one or more slave devices operate as peripheral devices, the peripheral devices may advertise for connection in their allocated time interval or slot without interrupting the data transmitted by the broadcasting devices. In at least one embodiment, the repeater node is capable of switching modes between BLE master to receive data from extended node which acts as BLE slave, and BLE slaves to send data to central processing unit 102 in which case the central processing unit 102 operates as BLE master. The central processing unit 102 can also operate as a BLE Master controller according to two modes. A first mode is referred to as a BLE observer mode to receive broadcast packets/beacon packets). The second mode is referred to as a BLE central mode to connect and communicate to one or more slaves nodes operating in the peripheral mode.

In another example, the slave nodes can be installed with emergency alert circuitry (e.g., smoke detection circuitry, intrusion detection circuitry, etc.) to establish an emergency alert system (e.g., a fire alarm system, a building security system, etc.). In this case, the central processing unit 102 (e.g., control panel) allocates unique transmission time intervals or time slots to each channel of the emergency system. Therefore, a given channel is dedicated by a corresponding slave node responsible to outputting an alert signal thereto. Accordingly, the slave nodes can take turn monitoring their respective channels to reduce power consumption of the overall emergency system, while outputting alert signals on their respective channel when necessary.

As described above, various non-limiting embodiments provide a wireless communication network that includes a central processing unit or central access point which assigns a unique periodic reporting time slot to each slave node installed in the network. No assigned transmission time interval is the same such that the central processing unit ensures that data transmission from one slave nodes will not interfere or will not collide with data transmissions from any of the remaining slave nodes. Because the central process node assigns each slave node with a unique time slot, the central processing unit can identify a particular slave node based on an arrival time of a given data packet. In this manner, the slave nodes are not required to transmit additional identification (ID) information or unique ID codes with their data packet thereby reducing the operating load of the central processing unit and increasing overall network processing speeds The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As used herein, the term "module" or "unit" refers to an application specific integrated circuit (ASIC), an electronic circuit, a microprocessor, a computer processor (shared, dedicated, or group) and memory that executes one or more software or firmware programs, an electronic hardware controller, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage unit capable of storing algorithms, logic or computer executable instruction, and that contains the circuitry necessary to interpret and execute instructions While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A wireless network data communication system, comprising:
   a plurality of electronic slave nodes, each slave node having assigned thereto a transmission time interval and configured to transmit data based on its assigned transmission time interval; and
   an electronic central processing unit in signal communication with the slave nodes, the central processing unit configured to receive transmitted data from the slave nodes, and to identify a given slave node from among the plurality of slave nodes based on a comparison between an arrival time at which transmitted data was received and the transmission time intervals assigned to each slave node, the transmission time intervals assigned to each slave node being different from one another, wherein the plurality of slave nodes include:
a repeater node located at a direct communication distance from the central processing unit that allows the repeater node to electrically communicate directly with the central processing unit; and
an extended node in signal communication with the repeater node, while located beyond the direct communication distance, and
wherein the repeater node is configured to transmit data from the extended node to the central processing unit,
wherein the central processing unit is configured to identify the given slave node without requiring additional identification information transmitted by the given slave node, and
wherein the given node is identified in response to the arrival time matching the transmission time interval assigned to the given node.

2. The wireless network data communication system of claim 1, wherein the extended node is assigned an extended node transmission time interval different from the transmission time intervals of the repeater node and remaining slave nodes.

3. The wireless network data communication system of claim 2, wherein the repeater node relays the transmitted data from the extended node during the extended node transmission time interval, and wherein the central processing unit identifies the extended node based on a comparison between the arrival time of the transmitted data and the extended node transmission time interval.

4. The method of claim 3, wherein the repeater node selectively transitions between a sleep mode that consumes a first amount of power and an active mode that consumes a second amount of power greater than the first amount of power, the repeater node awaking from the sleep mode to invoke the active mode in response to detecting the extended node transmission time interval.

5. The wireless network data communication system of claim 1, wherein prior to receiving transmitted data from the extended node, the repeater node performs a synchronization process that synchronizes the extended node with respect to the repeater node and remaining slave nodes.

6. The wireless network data communication system of claim 5, wherein the synchronization process comprises:
in response to receiving an installation request from the extended node, the repeater node assigns the extended node transmission time interval, and outputs a time interval schedule to the central processing unit, the time interval schedule indicating the extended node transmission time interval assigned to the extended node.

7. A method of synchronizing a plurality of electronic slave nodes installed in a wireless communication network system, the method comprising:

establishing direct signal communication between an electronic central processing unit and at least one slave node that is located at a direct communication distance from the central processing unit;
assigning each slave node among the plurality of slave nodes a transmission time interval indicative of a time at which the slave node transmits data, the transmission time interval assigned to each slave node being different from one another;
transmitting data from a given slave node among the plurality of slave nodes at its assigned data transmission interval;
identifying, via the central processing unit, the given slave node based on a comparison between an arrival time at which transmitted data was received by the central processing unit and the transmission time intervals assigned to each slave node, the given slave node being identified without requiring additional identification information transmitted by the given slave node;
identifying, by the central processing unit, the given slave node in response to the arrival time matching the transmission time interval assigned to the given node;
locating an extended node beyond the direct communication distance;
establishing signal communication between at least one slave node located less than or equal to the direct communication distance such that the at least one slave node operates as a repeater node; and
relaying transmitted data from the extended node to the central processing unit using the repeater node at the direct communication distance.

8. The method of claim 7, further comprising assigning, to the extended node, an extended node transmission time interval that is different from the transmission time intervals of each slave node among the plurality of slave nodes.

9. The method of claim 8, further comprising relaying, via the repeater node, the transmitted data output from the extended node to the central processing unit during the extended node transmission time interval.

10. The method of claim 9, wherein prior to receiving transmitted data from the extended node, the repeater node performs a synchronization process that synchronizes the extended node with respect to the repeater node and remaining slave nodes.

11. The method of claim 9, wherein the central processing unit identifies the extended node based on a comparison between the arrival time of the transmitted data and the extended node transmission time interval.

12. The method of claim 8, further comprising:
monitoring, via the repeater node, the extended node transmission time interval of the extended node;
operating the repeater node in a sleep mode that consumes a first amount of power of the repeater node; and
transitioning the repeater node from the sleep mode into an active mode during the extended node transmission time interval to receive the transmitted data output from the extended node.

* * * * *